July 8, 1958 L. V. BELL 2,841,873
ELLIPSOGRAPH
Filed April 6, 1954 3 Sheets-Sheet 1

INVENTOR
Leroy V. Bell
BY
ATTORNEY

July 8, 1958
L. V. BELL
2,841,873
ELLIPSOGRAPH
Filed April 6, 1954
3 Sheets-Sheet 2
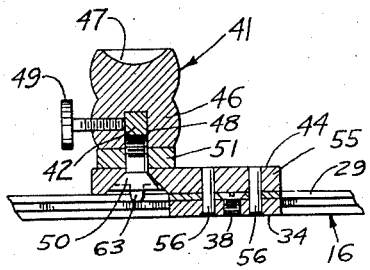
Fig. 4
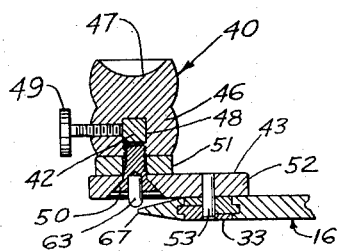
Fig. 5
Fig. 7
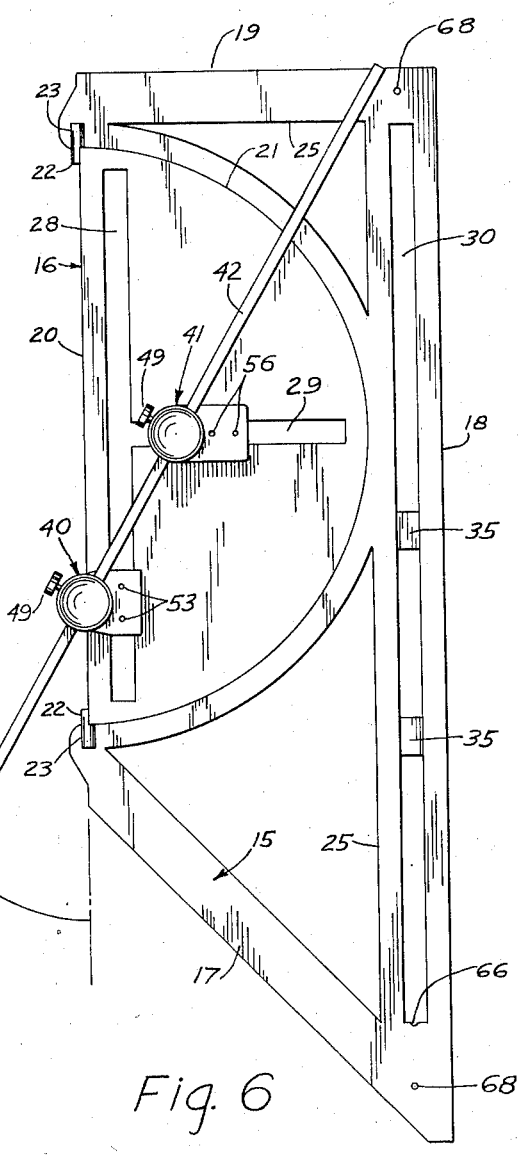
Fig. 6
INVENTOR
Leroy V. Bell
BY
*Albert P. Davis*
ATTORNEY July 8, 1958  L. V. BELL  2,841,873
ELLIPSOGRAPH
Filed April 6, 1954  3 Sheets-Sheet 3
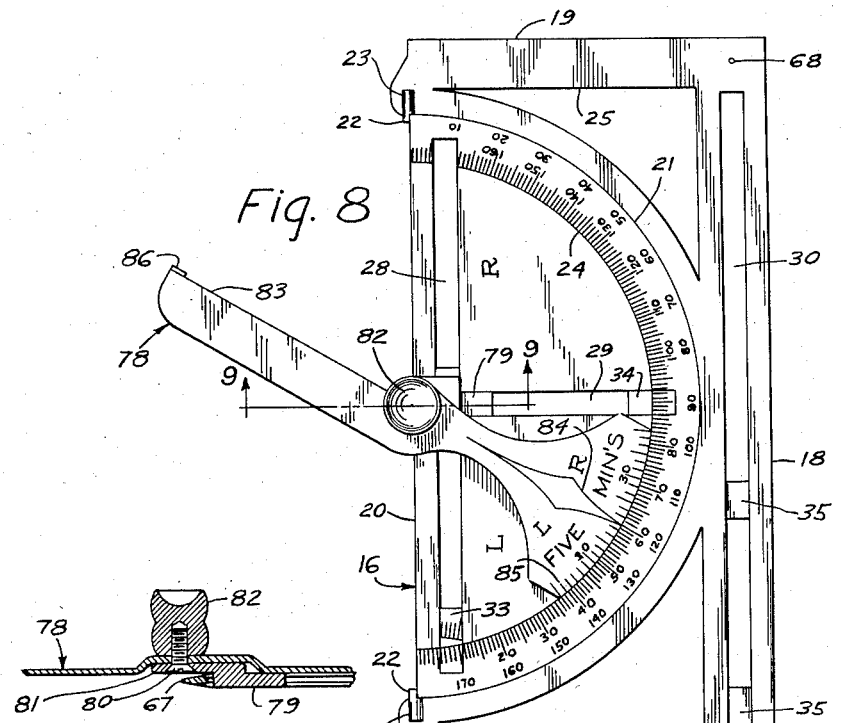
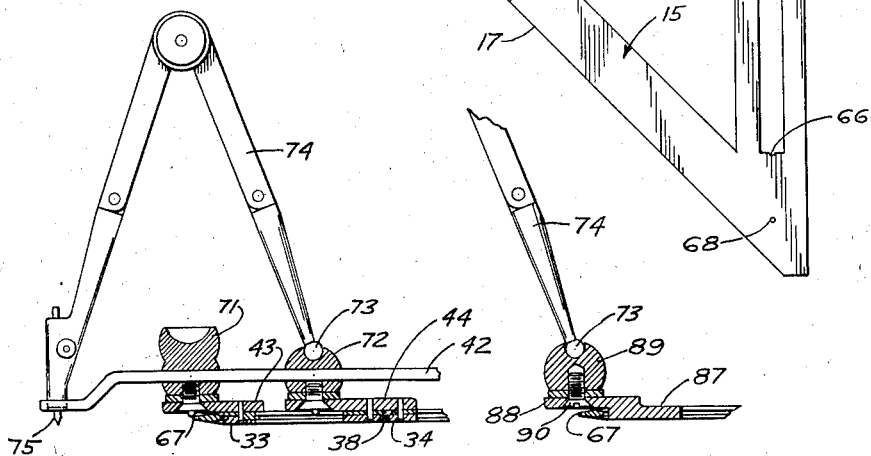
INVENTOR
Leroy V. Bell
BY
ATTORNEY

United States Patent Office 2,841,873
Patented July 8, 1958

2,841,873
ELLIPSOGRAPH
Leroy V. Bell, Wakefield, R. I.

Application April 6, 1954, Serial No. 421,370

3 Claims. (Cl. 33—31)

The present invention relates to a drafting instrument and more particularly pertains to such an instrument capable of drawing ellipses of any predetermined size, within the limits of the instrument, and having any desired combination of major and minor axes.

Many attempts have been made in the past to provide draftsmen with an instrument for drawing ellipses. However, these prior instruments have been cumbersome devices for the most part capable of only the one use, difficult to set, unreliable as to their operation, and costly to purchase.

One object of the present invention is to provide an ellipsograph that is simple and easy to set and operate.

Another object of the present invention is to provide an ellipsograph that can be accurately preset to draw ellipses having any desired major and minor axes.

Another object of the present invention is to provide an ellipsograph that can be inexpensively manufactured and sold.

Another object of the present invention is to provide a drafting instrument capable of drawing ellipses having predetermined axes and which is also capable of performing other drafting operations.

Other objects of the invention will be obvious and will in part appear hereinafter.

The invention accordingly comprises the apparatus possessing the features, properties and relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 4 is a sectional view showing details of one of the beam guiding members and the manner in which it engages its associated slide;

Fig. 5 is a sectional view showing details of the second beam guiding member and the manner in which it engages its associated slide;

Fig. 6 is a plan view similar to Fig. 1 but showing the beam in place and in the process of scribing an ellipse;

Fig. 7 illustrates a modification of the beam adapting it to use with a ruling pen;

Fig. 8 is a plan view of the instrument set up for use as a protractor;

Fig. 9 is a sectional view taken along line 9—9 of Fig. 8;

Fig. 10 is a fragmentary view partly in section showing a modified form of beam guiding member for use with a ball point compass; and Fig. 11 is a fragmentary view partly in section showing a frame engaging member adapted to receive a ball point compass to permit circles to be drawn.

Figures 1, 2, 3:
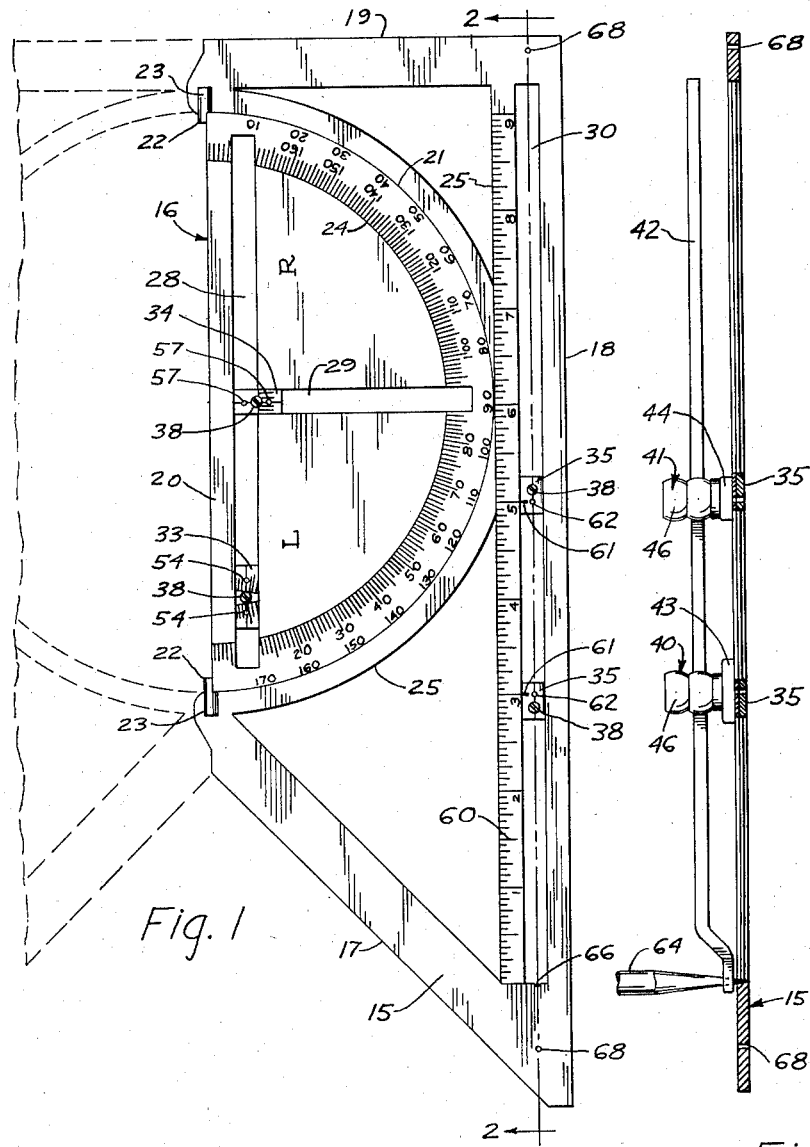
Figure 1 is a plan view of a preferred embodiment of the present invention.
Fig. 2 is a sectional view taken along the line 2—2 of Fig. 1, looking in the direction of the arrows, and showing the beam and beam guiding members.
Fig. 3 is a sectional view showing details of the slides and guide slots.

The ellipsograph of the present invention comprises a guiding frame having a pair of intersection slots formed therein each carrying a slide adapted to control a scribe guiding beam to cause a scribe to draw one-half of an ellipse. The guiding frame is pivoted to a second member whereby it can be pivoted to a second position wherein it can guide the drawing of the second half of the ellipse. The second member or locating frame is provided with a slot also carrying slides that are used to preposition slide engaging pieces adjustably mounted on the scribe guiding beam.

The guiding frame is semi-circular in shape and is graduated around its periphery in degrees of a circle whereby it can function as a protractor, and a slot engaging arm is provided to cooperate with said graduations to permit angles to be read.

Referring now to the drawing wherein there is disclosed a preferred embodiment of my invention. The ellipsograph comprises a locating or holding frame 15 and a semi-circular guiding frame 16. The two frames 15 and 16 fit together to form an assembly that is generally trapezoidal in shape. Edges 17, 18 and 19 of locating frame 15 form three sides of the trapezoid and straight edge 20 of semi-circular guiding frame 16 forms the fourth side of the trapezoid parallel to side 18. Edge 20 is back from the true diameter of semi-circular guiding frame 16 a slight distance to permit the major axis of an ellipse to be drawn, as hereinafter explained, to be visible when the instrument is in position. Edge 20 is spaced from said diameter a distance such that when a pencil engages it the point of the pencil will rest on said diameter. The upper edge 21 of locating frame 15 is cut out in a semi-circle that mates with the semicircular edge of guiding frame 16. A pair of pintles 22 are fixed to the straight edge of frame 16 in axial alignment with the true diameter of said frame 16. Edge 21 of frame 15 is provided with a pair of aligned notches 23 that receive pintles 22 to removably hold frame 16 in frame 15 and to permit said frame 16 to swing from a position inside frame 15 to a position outside thereof. Guiding frame 16 is graduated to show degrees of a circle adjacent its curved edge, as shown at 24, for a purpose that will become apparent hereinafter. Frame 15 can be provided with cut out portions 25 to lighten it and to facilitate lifting it.

A pair of slots 28 and 29 are provided in guiding frame 16. Slot 28 is adjacent and parallel to edge 20 and slot 29 is radial to the curved edge of frame 16, joins slot 28 at its mid-point and is normal thereto so that slots 28 and 29 taken together form a T-shiped slot. A third slot 30 is formed in frame 15 adjacent and parallel to side 18. The sides of slots 28, 29 and 30 are grooved as at 31, see Fig. 3, to receive tongues 32 formed on slide members 33, 34 and 35 slidably located in slots 28, 29 and 30 respectively. Slide members 33, 34 and 35 each are comprised of two identical halves 36 and 37 each having a tongue 32 formed on one edge. The two slide halves 36, 37 are assembled in their respective slots and are held together by screw 38 which passes through an opening in one half and threadedly engages an aligned hole in the other half. Inasmuch as the ends of slot 28 extend into graduations 24 both ends of slide 33 are provided with graduations to bridge the gap formed by said slot. Also the end of slot 29 extends into graduations 24 so the lowermost end of slide 34 is provided with graduations to bridge that gap. When the protractor features of the present invention are to be used slide 34 is moved to the end of its slot to thereby complete the mid-point of the protractor scale, see Fig. 8, and slide 33 is moved to either end of slot 28 to complete the end of the scale that is to be used.

A pair of finger pieces 40 and 41 are adjustably carried by scribing beam 42 and are adapted to interlock with slides 33 and 34 respectively to guide the movement of said beam so that one end thereof will travel through an ellipse of predetermined size and shape. Finger pieces 40 and 41 are identical except for their base or slide engaging portions 43 and 44 respectively, therefore, finger piece 40 will be described in detail and the difference between the bases will be explained.

Finger piece 40 comprises an upstanding post 46 which can be of any convenient shape but which preferably has a double curved periphery to facilitate handling. The upper end of post 46 is provided with a concave socket 47 to receive the tip of the operator's finger as will be explained hereinafter. A square opening 48 passes through post 46 to slidably receive beam 42. A thumb screw 49 passes through a threaded opening in post 46 to engage and lock beam 42 in its adjusted position. Post 46 is pivotally secured on base or slide engaging portion 43 by means of screw 50 which passes upwardly through a hole in said base, through washer 51 and is threadedly engaged in a threaded hole in the lower end of said post. Base 43 extends to one side of post 46 and this extension 52 is fitted with two pins 53 that project beneath the lower surface of said base and which are spaced the proper distance apart to fit into holes 54 in slide 33 to couple said slide and base together. Base or trammel engaging portion 44 differs from base 43 in that its lateral extension 55 is longer than extension 52 and its slide engaging pins 56 are fitted along the longitudinal axis of base 44 instead of transverse to the axis as are pins 53. Pins 56 are spaced the proper distance apart to fit into holes 57 in slide 34.

Slot 30 and slides 35 are utilized to locate finger pieces 40 and 41 at the proper location on scribing beam 42 so that one end of said beam will scribe an ellipse having predetermined major and minor axes. To assist in this setting operation a scale 60 is marked on frame 15 adjacent slot 30 and with its zero graduation corresponding to the left end of slot 30. Scale 60 can be any convenient unit of measure, the scale shown in Fig. 1 is in inches. Both slides 35 are provided with index lines 61 that are incribed along side of sockets 62 in said slides. To set finger pieces 40 and 41, slides 35 are set in slot 30 with their index lines 61 at the graduations that correspond to one-half the major and minor axes of the desired ellipse. For example, if an ellipse is desired having a major axis of 10 inches and a minor axis of 6 inches right hand slide 35 would be positioned in slot 30 with its index line 61 at the 5 inch graduation of scale 60. Left hand slide 35 would be positioned with its index 61 at the 3 inch graduation of scale 60. Thumb screws 49 are loosened and finger pieces 40 and 41 are slid along beam 42 until locating pins 63, fitted in screws 50 in axial alignment therewith, can be inserted into sockets 62 in slides 35. The tip of a pencil 64 is then passed through opening 65 in the end of beam 42 and said beam slid in holes 48 until the pencil point engages in notch 66 at the left hand end of slot 30 to register said pencil point with the zero graduation of scale 60. With the beam 42 held in this position thumb screws 49 are tightened to prevent further relative movement between said beam and finger pieces.

Slide 34 is moved upwardly as far as it will go in slot 29, until its end engages the side of slot 28, and slide 33 is positioned in the left side of slot 28. Beam 42 and finger pieces 40 and 41 are then lifted as a unit from slides 35 and pins 56 in base 44 are fitted into holes 57 in slide 34. Slide 33 is moved in slot 28 until pins 53 in base 43 enter holes 54 therein. The ellipsograph is then positioned on the drawing paper with its edge 20 falling along the major axis of the ellipse to be drawn, and with the center line of slot 29 aligned with the minor axis of the ellipse. With the instrument thus arranged beam 42 will have its center line aligned with the major axis of the ellipse. The point of pencil 64 is again inserted through opening 65 in beam 42 and guided with one hand. The fore-finger and middle-finger of the other hand are then placed in the concave sockets 47 of finger pieces 40 and 41 to assist in moving slides 33 and 34. As pencil 64 is moved upwardly slide 34 will descend in slot 29 and slide 33 will move from left to right in slot 28. Slide 34 will reach the lowest point in its movement when slide 33 reaches the midpoint of slot 28 and pencil 64 and opening 65 reaches the minor axis. Continued movement of pencil 64 and beam 42 moves slide 33 into the right hand end of slot 28 and slide 34 arrives back at its uppermost position when said pencil and opening reach the right-hand side of the major axis. At this time one-half of an ellipse will have been traced by pencil 64 on the drawing paper. Beam 42 and finger pieces 40 and 41 are removed from slides 33 and 34. Guide frame 16 is pivoted about pintles 22 until it lies flat on the drawing paper and outside frame 15. Following this move, frame 15 is turned over, also around pintles 22, so that the instrument is positioned on the other side of the major axis, as shown in dotted lines in Fig. 1. It will be understood that instead of pivoting the two frames over one at a time the entire instrument can be picked up and turned over or picked up and turned around. However, pivoting it over in sections is fast and insures the instrument being accurately positioned to draw the second half of the ellipse. After the instrument has been repositioned as above described, finger pieces 40 and 41 are replaced on slides 33 and 34 with pins 53 and 56 again positioned in holes 54 and 57 respectively and the second half of the ellipse drawn in the same manner as the first half.

Edge 20 of frame 16 is beveled as shown at 67 to permit the locating pin 63, carried by finger piece 41, to pass up over said edge 20 as slide 34 moves downwardly in slot 29. Pins 56 are longer than locating pin 63 so that the slight upward movement of finger piece 41 will not disengage pins 56 from holes 57.

The weight of frames 15 and 16 can be such that when the instrument is used on a horizontal surface it will remain in position while the desired ellipse is being drawn. Holes 68 are provided in frame 15 to receive thumb tacks to secure the instrument to a slanting surface, or drafting tape can be employed to secure the frame.

Figure 7 illustrates a modification to the end of the scribing beam 42 wherein the opening 65 is replaced with a U-shaped yoke 68 adapted to receive a ruling pen so that ellipses can be drawn in ink.

When small ellipses are to be drawn it is often more convenient to use a compass in connection with the present invention. Fig. 10 illustrates a modification of the instrument to make such use possible. The modification of Fig. 10 comprises the substitution of a knob 72 for upstanding post 46 on base or slide engaging portion 44. Knob 72 is provided in its top with a semi-spherical socket adapted to receive a ball point 73 of compass 74. The pencil 75 of compass 74 is passed through the opening 65 in the end of beam 42. It will be seen that with this arrangement the manipulation of the pencil and slide 33 and 34 can be accomplished with one hand which grasps compass 74 assisted if desired by one finger of the other hand placed in concave socket 47 of post 46.

When the instrument is to be used as a protractor slides 33 and 34 are moved to the extremities of slots 28 and 29 to complete the protractor scale and to leave free and unobstructed the intersection of said slots. A protractor arm 78 is pivotally secured to T-shaped slot engaging member 79 by means of screw 80 which passes through finger 81 extending from T-shaped member 79, through an opening in said arm 78 and into finger piece 82 which acts as a nut. The T-shaped member fits firmly into the intersection of slots 28 and 29 to hold arm 78 against all but rotary movement. The length of finger 81 is such that the axis of screw 80 coincides with the point where the true diameter of frame 16 and the axis of slot 29 intersect. Arm 78 is pivoted about screw 80 intermediate its ends and on one side of said screw has an edge 83 in alignment with axis of screw 80. Edge 83 is provided with a stop 86 adjacent its end adapted to engage edge 20 of frame 16 to prevent edge 83 from pivoting past the true diameter of frame 16. Arm 78, on the other side of screw 80, is provided with a pointer 84 diametrically opposed from edge 83, and a vernier 85. When used as a protractor the axis of screw 80 is placed over the apex of the angle to be measured and with edge 20 lying along one leg of said angle. Arm 78 is then pivoted until its edge 83 lies along the other leg of the angle and the angle is read at 84 or the appropriate position on vernier 85.

The present invention is also useful for drawing circles and arcs of circles. To adapt the instrument for this use slides 33 and 34 are positioned in the extremities of their slots and a T-shaped slot engaging member 87, similar to member 79, is fitted into the intersection of slots 28 and 29. A finger 88 projects from member 87 and has knob 89 fixedly secured to the upper surface thereof by means of screw 90. The top of knob 89 has a semi-spherical socket formed therein, immediately above the intersection of the true diameter of frame 16 and the center line of slot 29, to receive the ball point of compass 74. When used in this condition frame 16 is positioned with the axis of screw 90 over the desired center, compass point 73 is placed in the semi-spherical socket and any desired number of concentric circles or arcs can be drawn.

Since certain changes may be made in the above described apparatus without departing from the scope of the invention herein involved, it is intended that all matter contained in the above description or shown in the accompanying drawings shall be interpreted as illustrative and not in a limiting sense.

What is claimed is:

1. An ellipsograph comprising a guiding frame having a T-shaped slot formed therein by two intersecting slots, a slide carried in each of said slots for longitudinal movement therein, each of said slides having an opening formed therein and extending through the slides, a scribing beam, a pair of posts adjustably mounted on said beam, a base pivotally carried by each of said posts and having a pin projecting therefrom to selectively engage said openings on either side of said frame for connecting said posts to said slides, means on said beam for guiding a scribing instrument to draw half an ellipse as said slides are moved in said slots, a locating frame, and means pivotally connecting said guiding frame to said locating frame for swinging movement about an axis of said ellipse.

2. An ellipsograph as set forth in claim 1 wherein each of said slides comprises two substantially identical members secured together, each member having a tongue formed on one edge thereof and the members being so positioned with respect to each other that said tongues project from opposite sides of said slide and are engaged in grooves formed in the sides of said slots.

3. An ellipsograph as set forth in claim 2 wherein said means pivotally connecting guide frame and locating frame are a pair of pintles secured to one of said frames and engaged in a pair of notches formed in the other frame.

References Cited in the file of this patent

UNITED STATES PATENTS

| 288,235 | Hanstein | Nov. 13, 1883 |
| 302,247 | Harwood | July 22, 1884 |
| 1,031,780 | Fine | July 9, 1912 |
| 1,179,706 | Doerr | Apr. 18, 1916 |
| 1,299,006 | Muller | Apr. 1, 1919 |
| 2,176,798 | Hines | Oct. 17, 1939 |
| 2,352,169 | Alexander | June 27, 1944 |
| 2,452,484 | Noble | Oct. 26, 1948 |
| 2,537,058 | Jamison et al. | Jan. 9, 1951 |
| 2,646,623 | Coats | July 28, 1953 |
| 2,777,199 | Neiglick | Jan. 15, 1957 |

FOREIGN PATENTS

| 144,157 | Great Britain | June 10, 1920 |
| 608,944 | Great Britain | Sept. 23, 1948 |